United States Patent [19]

Blanch et al.

[11] Patent Number: 5,073,575
[45] Date of Patent: Dec. 17, 1991

[54] CADMIUM ION-CHELATING SYNTHETIC POLYMERS AND PROCESS THEREOF

[75] Inventors: Harvey W. Blanch, San Francisco, Calif.; John Yin, Kensington, Md.

[73] Assignee: The Regents of the University of California, Oakland, Calif.

[21] Appl. No.: 237,392

[22] Filed: Aug. 26, 1988

[51] Int. Cl.$^5$ ............................ C08F 8/28; C08F 8/34
[52] U.S. Cl. .................................. 521/33; 521/32; 525/343; 525/350
[58] Field of Search ................... 521/33, 32; 526/288; 525/343, 350

[56] References Cited

U.S. PATENT DOCUMENTS

| | | | |
|---|---|---|---|
| 3,884,846 | 5/1975 | Otsuki et al. | 525/343 |
| 4,021,416 | 5/1977 | Locatell, Jr. | 526/288 |
| 4,115,297 | 9/1978 | Boito et al. | 521/33 |
| 4,435,545 | 3/1984 | Favie et al. | 525/350 |
| 4,530,963 | 7/1985 | De Vee . | |

OTHER PUBLICATIONS

Chem. Abstracts, vol. 107: 1171702, Tenfeld et al.
Chien-Da S. Lee, "Mercaptan-Containing Polymers", Advances in Polymer Science, Fortschritte der Hochpolymeren-Forschung, Springer-Verlag, Berlin, vol. 15, 1974, pp. 61–90.
Michael H. Frey et al., "Polypetide-Metal Cluster Connectivities in Metallothionein 2 by Novel H-$^{113}$Cd Neteronuclear Two-Dimensional NMR Experiments", J. Am. Chem. Soc., 1985, vol. 107, pp. 6847–6851.
Bio-Rad, "Chelex TM 100 Chelating Ion Exchange Resin for Analysis, Removal or Recovery of Trace Metals", Bio-Rad Laboratories Bulletin 2020, 1986, pp. 1–4.

(List continued on next page.)

*Primary Examiner*—Thurman K. Page
*Assistant Examiner*—Peter F. Kulkosky
*Attorney, Agent, or Firm*—Phillips, Moore, Lempio & Finley

[57] ABSTRACT

The present invention relates to an adsorbent polymer having improved selectivity for cadmium ion, comprising a water-insoluble polymeric material having available surface pendant chelating groups having a multiplicity of thiol (—SH) groups, wherein pairs of thiol groups are connected by a chain R having between about 10 and 16 atoms of the structure:

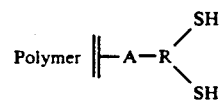

which thiol terminated chains are capable of chelating cadmium ion in rings of between about 11 and 17 atoms, and
A is selected from alkylene having from 1 to 10 carbon atoms, cycloalkylene, aryl or arylalkylene. Preferably the adsorbent polymer having improved selectivity for cadmium of claim 1, wherein the pendant chelating groups having a thiol structure:

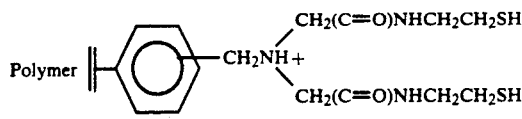

The invention also relates to a process for the removal of cadmium ion from an aqueous solution containing cadmium ion, which process comprises:

(a) contacting an aqueous solution containing cadmium ion with an effective amount of water-insoluble solid material having availiable surface pendant chelating groups having a multiplicity of thiol (—SH) groups, wherein pairs of thiol groups are connected by a chain R having between about 10 and 16 atoms of the structure (I) for a time effective for the pairs of thiol groups to bind the cadmium ion; and
(b) separating the solid material and the aqueous solution having a reduced content of cadmium ion.

3 Claims, 13 Drawing Sheets

OTHER PUBLICATIONS

Abstracts of Papers, 194th American Chemical Society Meeting, New Orleans, La., Aug. 30-Sep. 4, 1987.

Chuen-Ying Liu et al., "Preparation and Analytical Properties of a Chelating Resin Containing Cysteine Groups", *Analytica Chimica Acta*, 1981, vol. 132, pp. 187-193.

Elinor Adman et al., "NH-S Hydrogen Bonds in *Peptococcus aerogenes* Ferrodoxin, *Clostridium pasteurianum rubredoxin*, and *Chromatium* High Potential Iron Protein", *Proc. Natl. Acad. Sci. U.S.A.*, 1975, vol. 72, No. 12, pp. 4854-4858.

D. G. Hoare et al., "A Procedure for the Selective Modification of Carboxyl Groups in Proteins", Communications to the Editor, *J. Am. Chem. Soc.*, 1966, vol. 88, No. 9, pp. 2057-2058.

Jeremias H. R. Kagi et al., "Metallothionein: A Cadmium and Zinc-Containing Protein from Equine Renal Cortex: II. Physiochemical Properties", *J. Biol. chem.*, 1961, vol. 236, No. 6, pp. 2435-2442.

Bruce P. Gaber et al., "Cadmium and Arsenite Binding by N-Dihydrolipoylaminoethoxydextran: A Model Study of Enzyme Dithio Criteria", *Bioinorganic Chemistry*, 1972, vol. 2, pp. 135-148.

M. J. Hudson, "Metal Removal Using Coordinating Copolymers", Trace Metal Removal from Aqueous Solution, The Royal Society of Chemistry, R. Thomson Ed. Burlington House, London, pp. 137-157.

Bruce P. Gaber et al., "The Interaction of Cadmium and Zinc Ions with Thiol-Substituted Dextrans", *Bioinorganic Chemistry*, 1971, vol. 1, pp. 65-78.

G. Schmuckler, "Chelating Resins-Their Analytical Properties and Applications", Talanta, 1965, vol. 12, pp. 281-290.

FIG._2
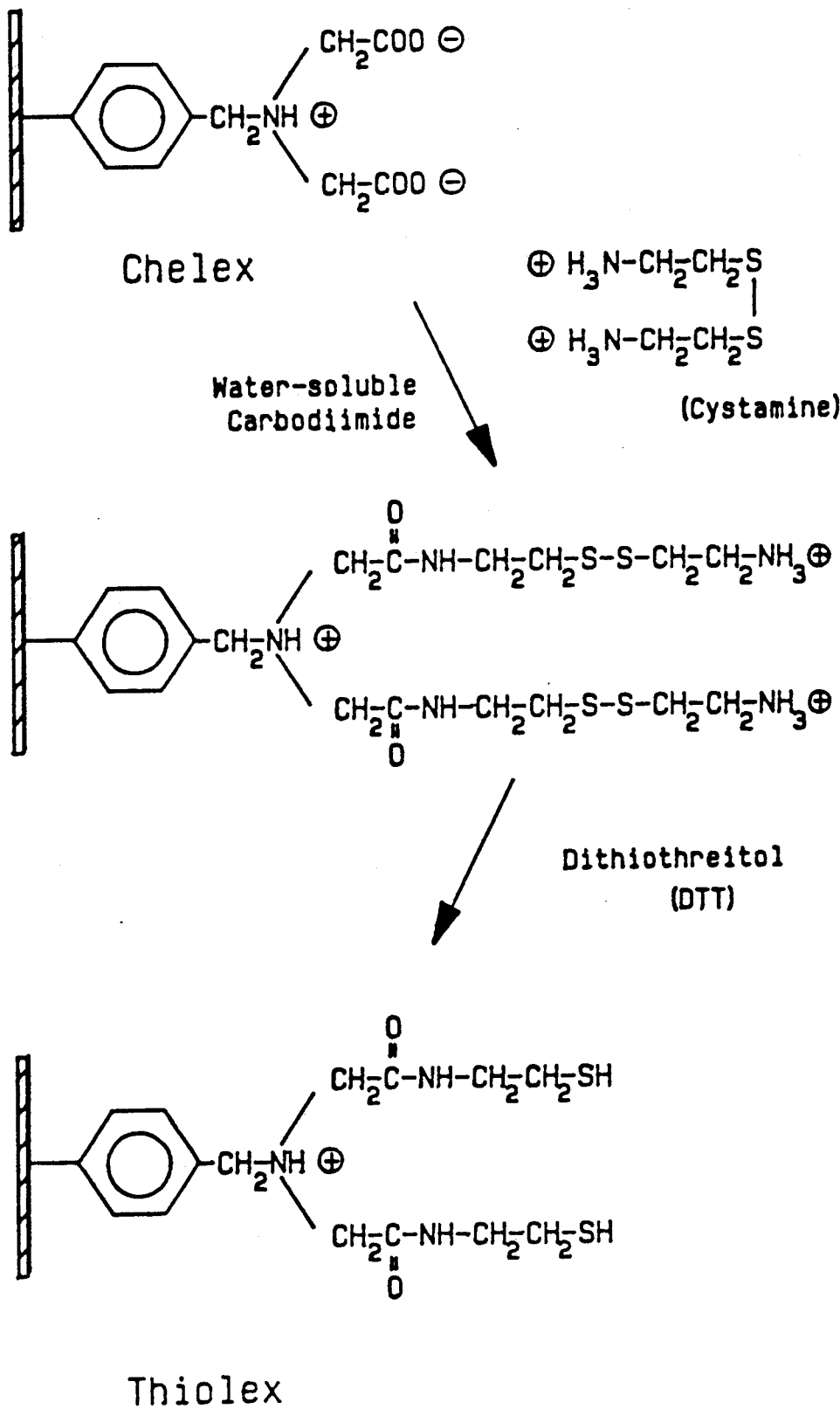

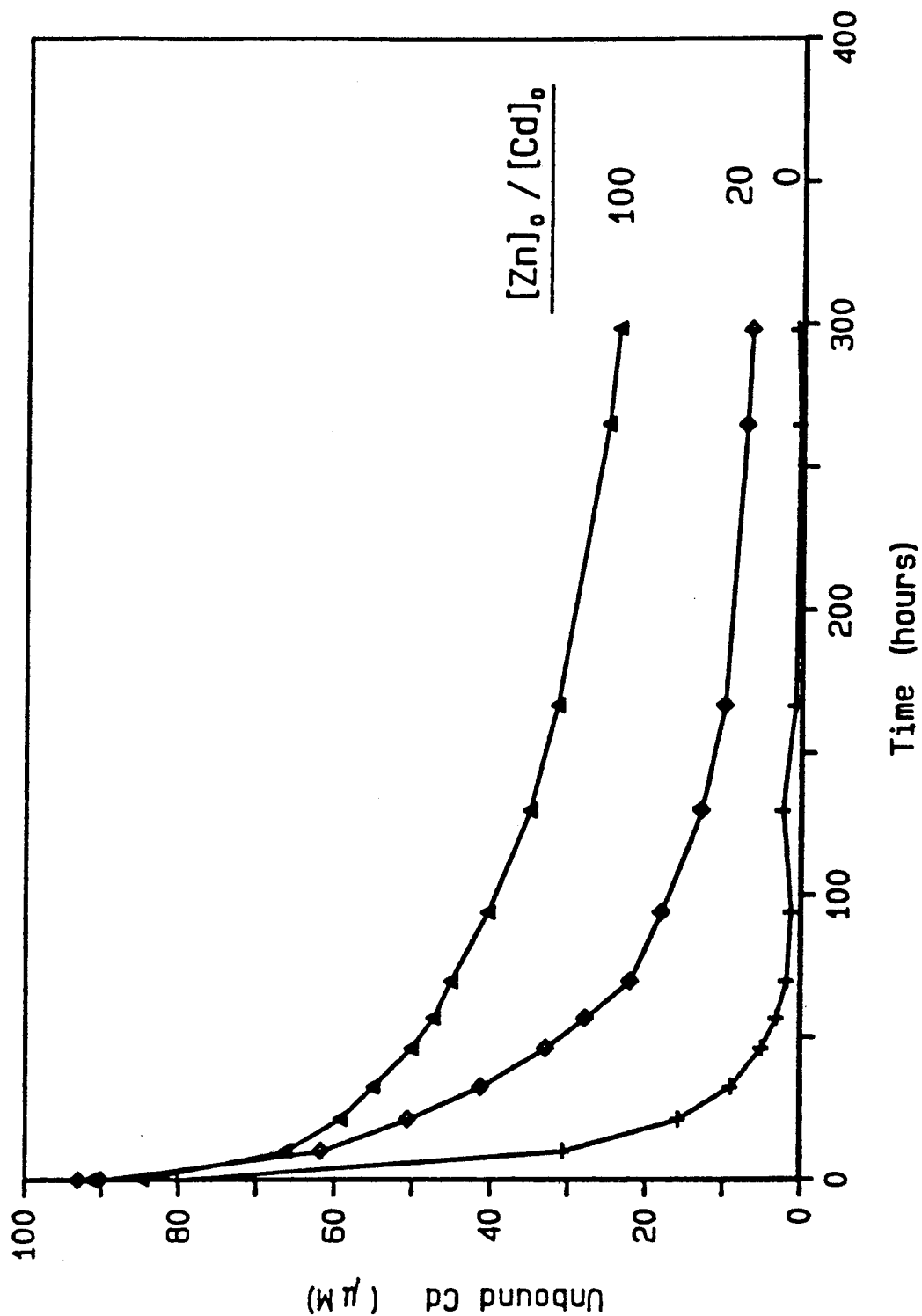
FIG._5A

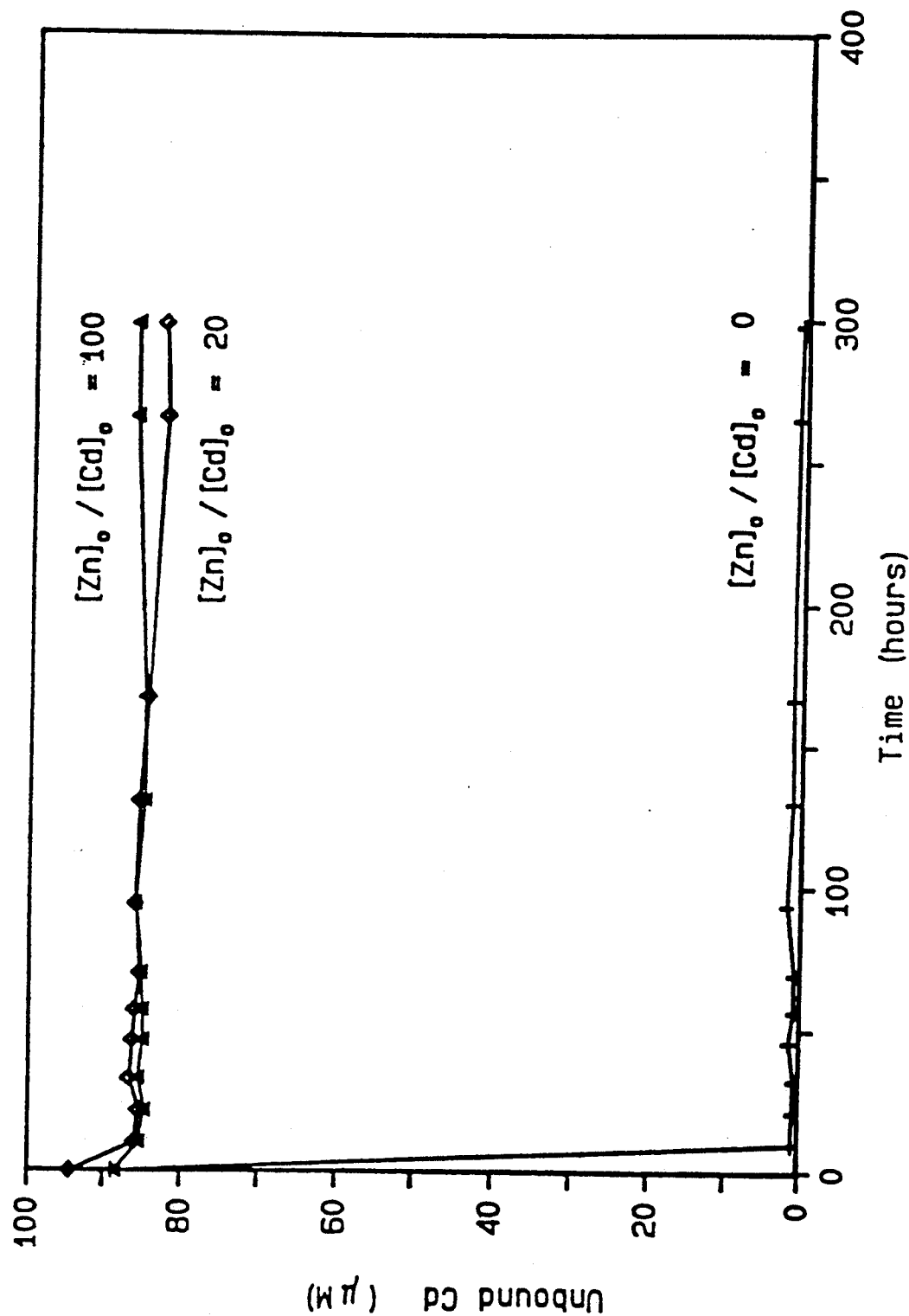
FIG._5B

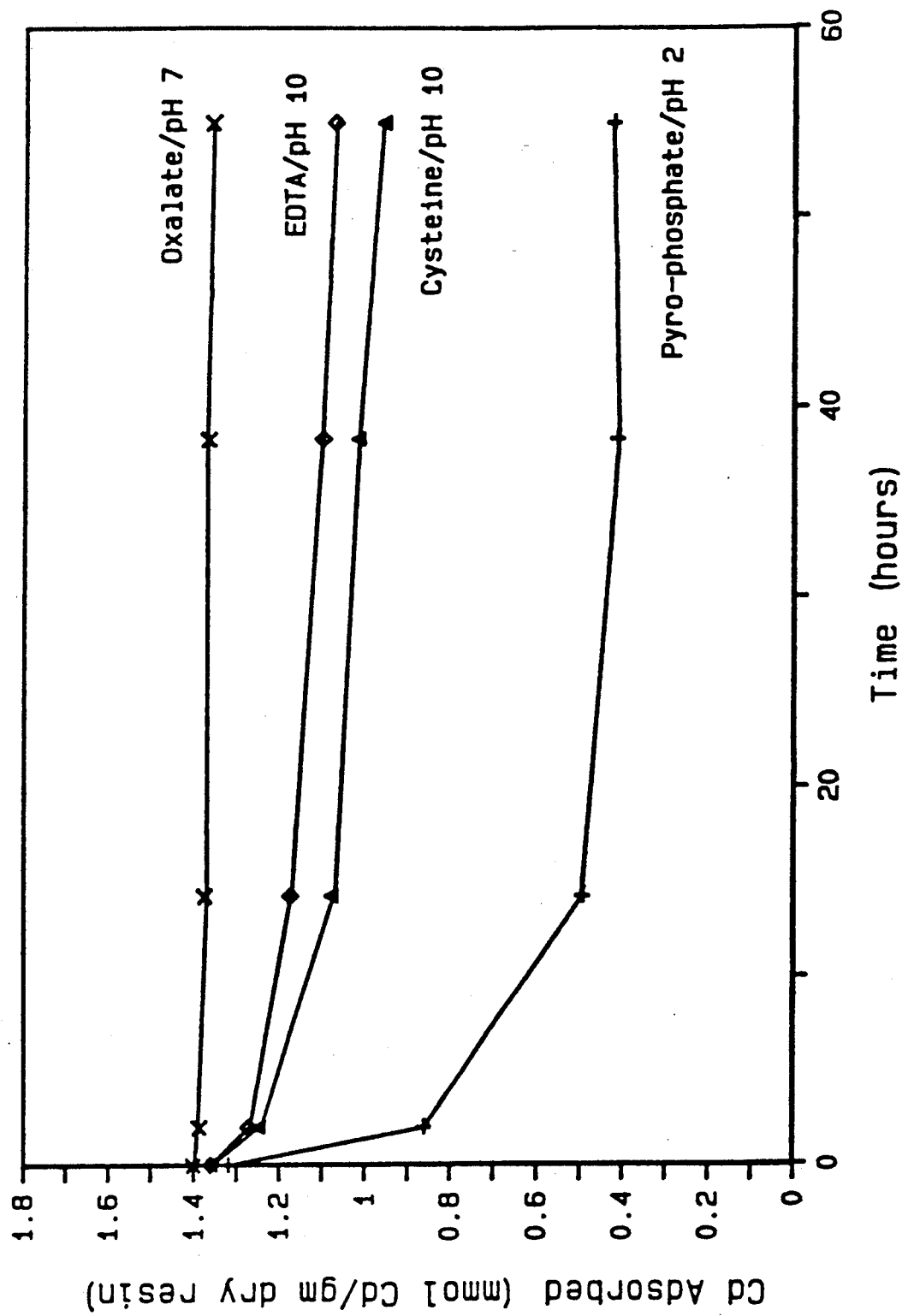

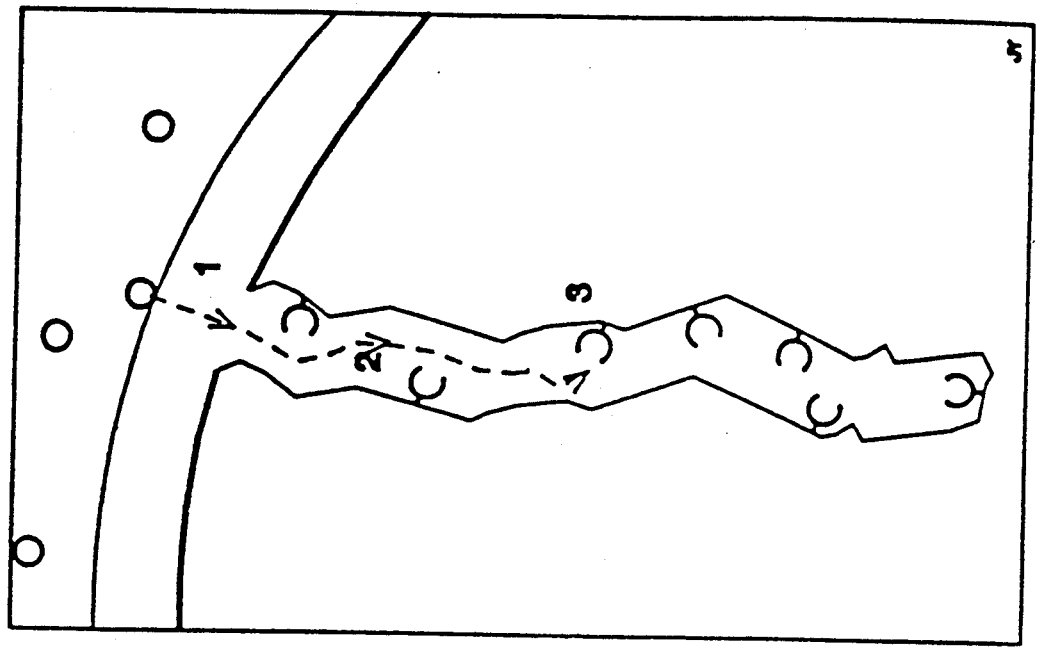
FIG._8B
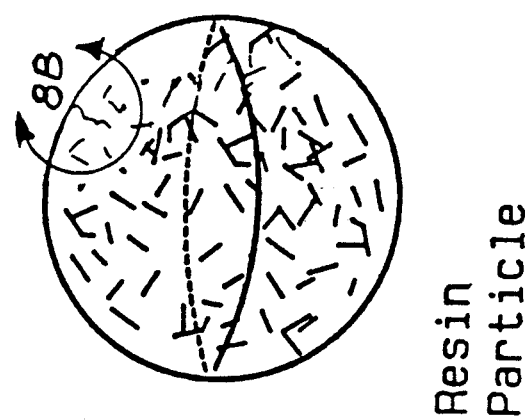
FIG._8A
Resin Particle
○ Metal Ion
⇃ Metal-Binding Site

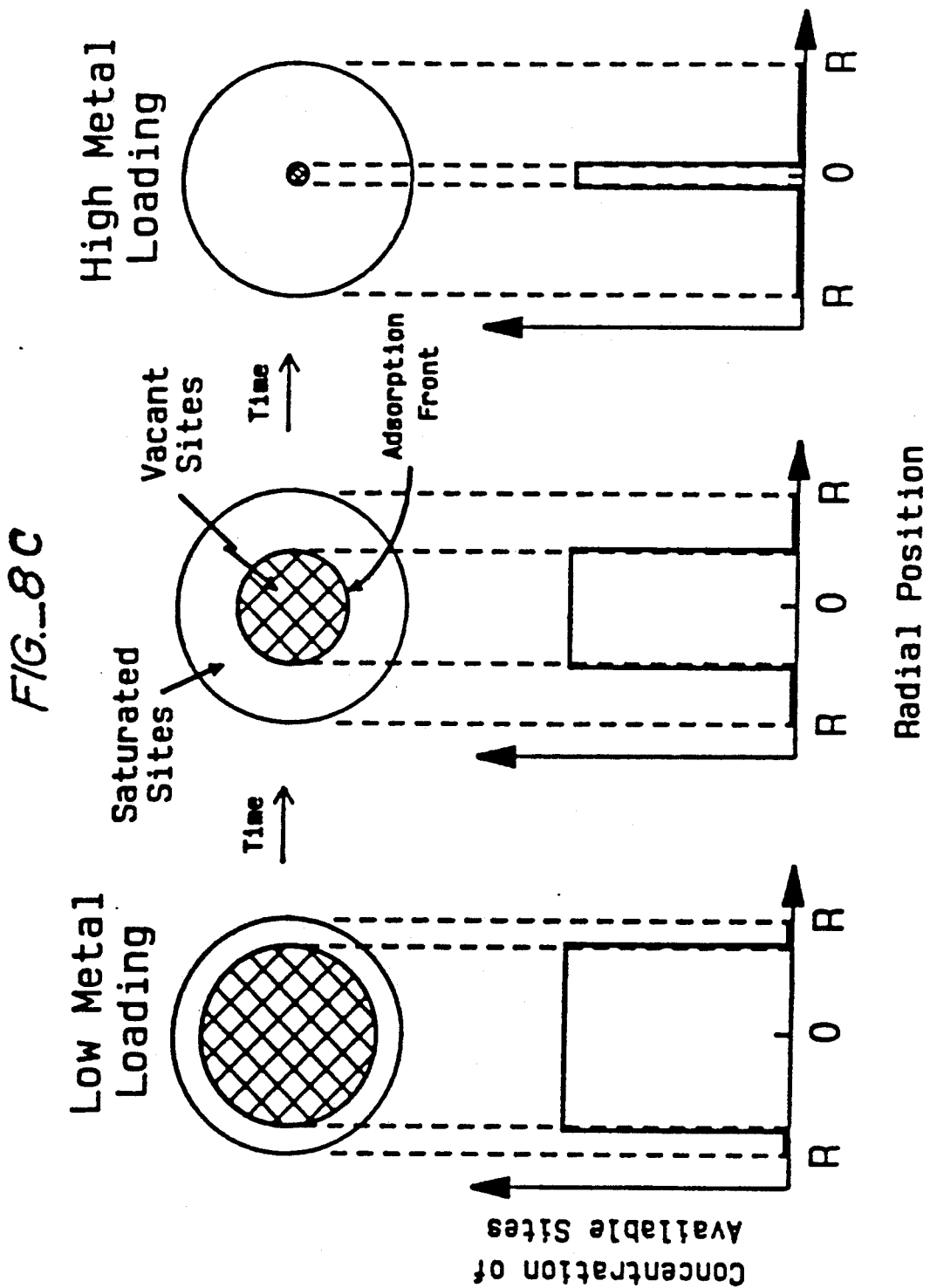
FIG._8C

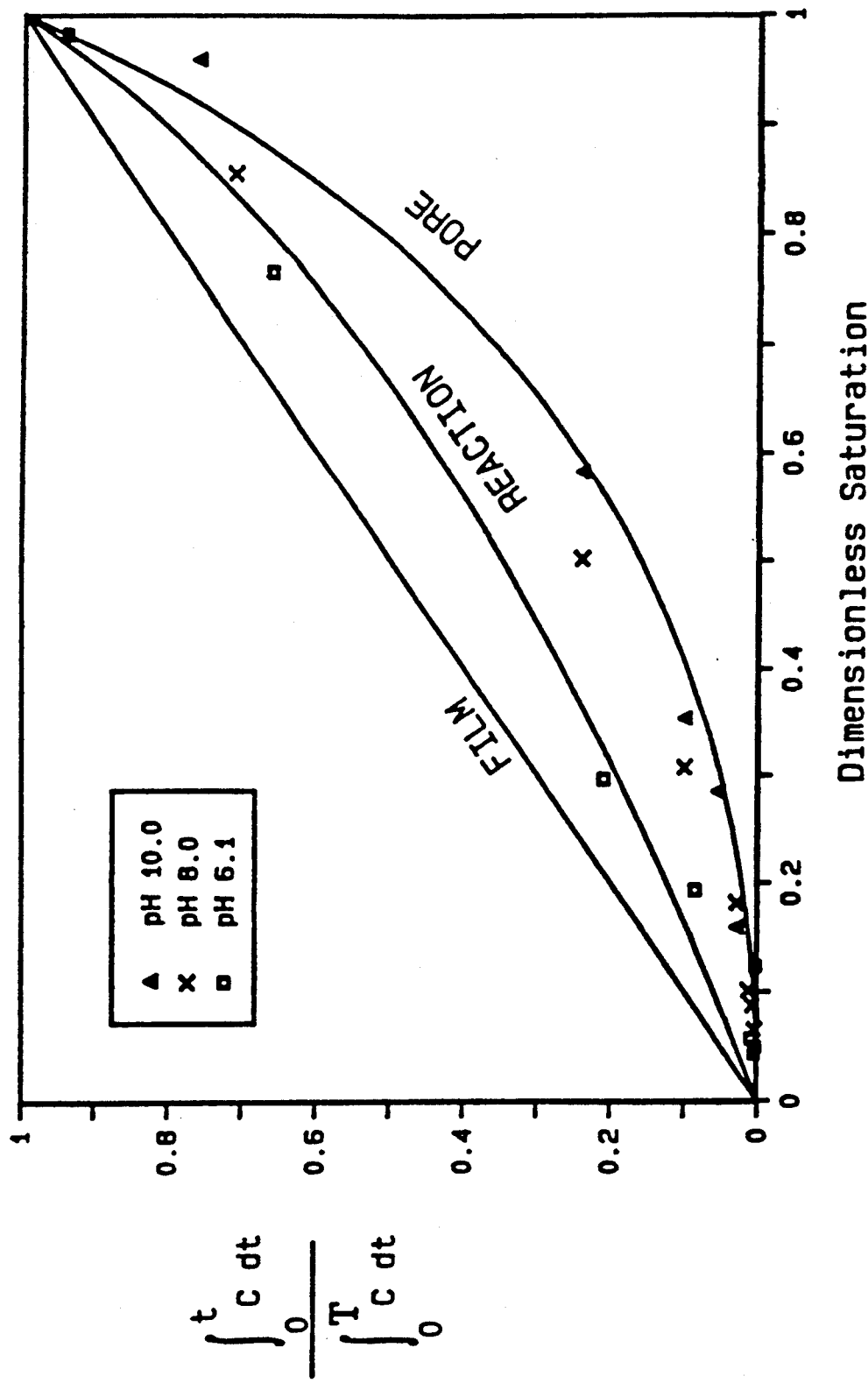
FIG._9

FIG._10
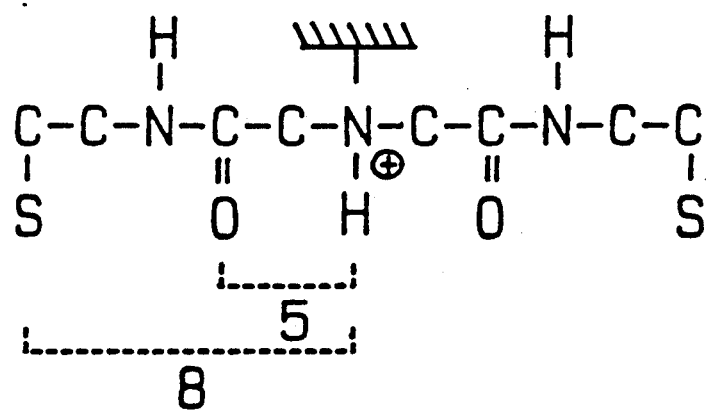
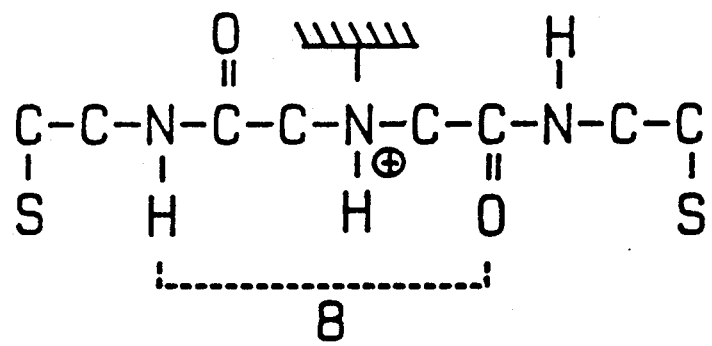
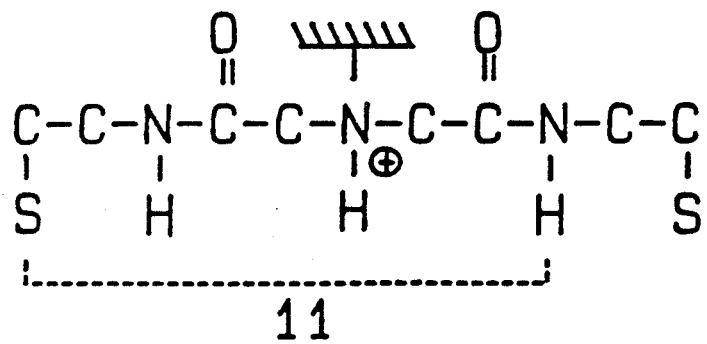

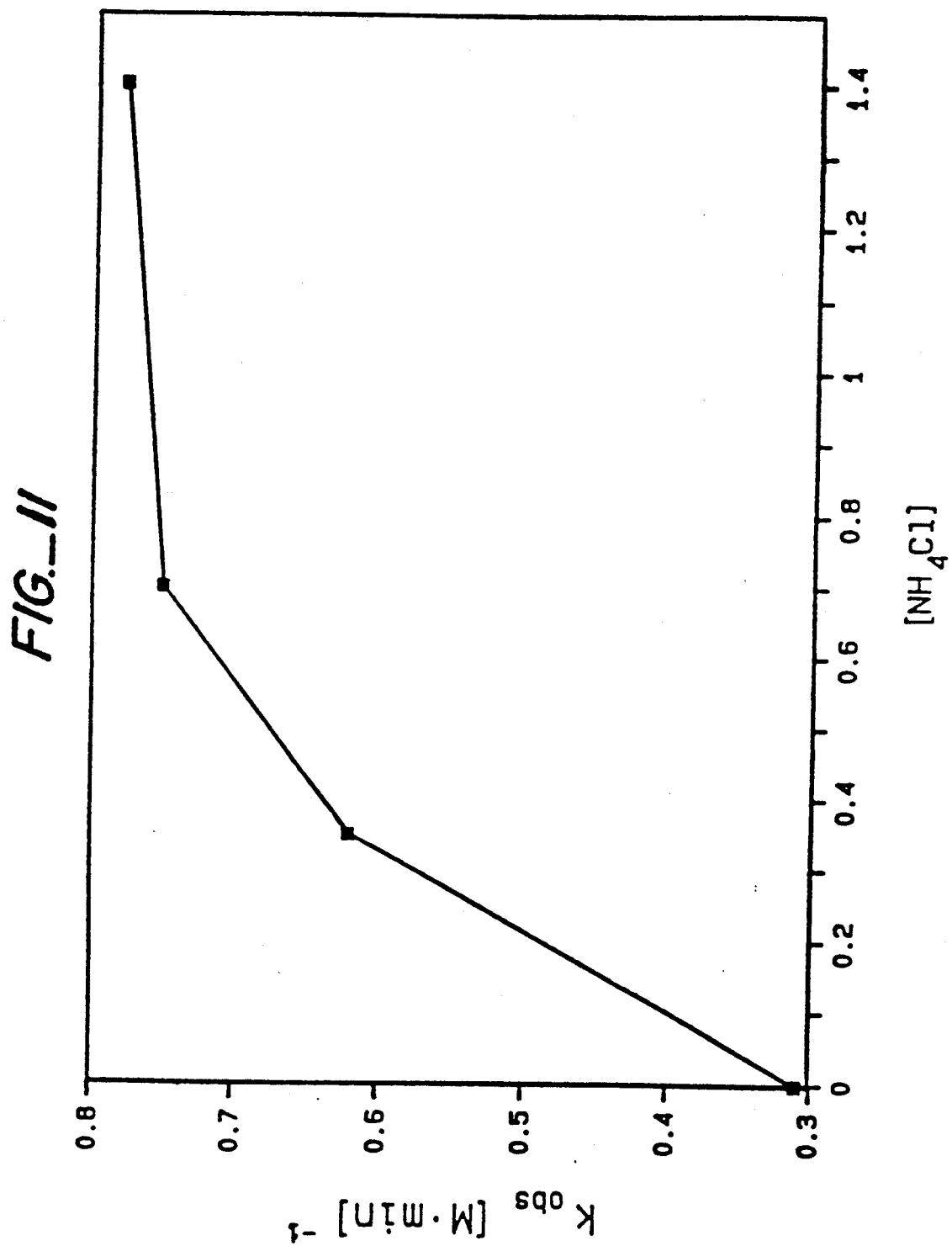
FIG._11

CADMIUM ION-CHELATING SYNTHETIC POLYMERS AND PROCESS THEREOF

BACKGROUND OF INVENTION

1. Origin of the Invention

Portions of the research leading to this invention were funded by the U.S. Environmental Protection Agency (Cooperative Agreement No. CR 811984-01-0) and the University of California (Berkeley) Chancellor's Patent Fund (No. 401220-09520).

2. Field of the Invention

The present invention relates to a solid material for removing cadmium ion ($Cd^{+2}$) from aqueous solutions. More specifically, the invention relates to a high molecular weight solid material containing multiple thiol (—SH) groups for the chelation and removal of cadmium ion from an aqueous solution, often in the presence of zinc ion, cyanide ion or other potentially interfering ions.

3. Description of the Related Art

Cadmium (Cd), an exceedingly toxic metal, is released into the environment by waste streams from the electroplating, pigments, plastic, battery and zinc refining industries. Cadmium accumulates readily in living systems. In humans it has been implicated as the cause of renal disturbances, lung insufficiency, bone lesions, cancer and hypertension. Such chronic effects are a result of cadmium's long half-life in most tissues--from 80 days in blood and 10 years in the liver to 25 years in kidney. The toxic nature of cadmium is recognized by the U.S. Environmental Protection Agency, which classifies cadmium as a "priority pollutant" and limits drinking water levels to 10 parts per billion.

Current technologies for waste stream treatment lack a sufficiently high affinity and selectivity to reduce residual cadmium to the levels dictated by ever more stringent government regulations. Processes which precipitate cadmium using hydroxide or carbonate usually reduces cadmium ion to parts-per-million levels, but fail in the presence of cadmium solubilizing agents, such as ammonia or cyanide--agents which often accompany cadmium in waste streams. Processes based on existing ion exchange resins, particularly ion-chelating resins, usually reduces cadmium ion to parts-per-billion levels, but are generally not selective for cadmium ion. In such cases, the resin will exhibit indiscriminately high affinities for many metals, e.g. Zn, Cd, Co, etc., and metals accompanying cadmium in waste streams will compete for potential cadmium-binding sites, drastically reducing the resin capacity for cadmium.

Some art of interest in this field includes:

I. W. DeVoe, et al., U.S. Pat. No. 4,530,963, which teaches the use of water-insoluble chelating compositions to remove iron from aqueous solutions.

C. Y. Liu and P. J. Sun, *Analytica Chemica Acta*, Vol. 132, pp. 187-193 (1981).

C. D. S. Lee and W. H. Daly, "Mercapton-Containing Polymers", *Advances in Polymer Science*, Vol. 15, Springer-Verlog, New York, 1974, pp. 62-90.

B. P. Gabor, et al., *Bioinorganic Chemistry*, Vol. 1, pp. 65-78 (1971).

B. P. Gabor, et al., *Bioinorganic Chemistry*, Vol. 2, pp 135-148 (1972).

M. J. Hudson, *Trace Metal Removal from Aqueous Solution*, Soecial Publication No. 61, (Proceedings of a Symposium organized by the Industrial Division of the Royal Society of Chemistry) as a part of the Annual Chemical Congress 1986, Apr. 9-10, 1986. R. Thompson (ed.), Royal Society of Chemistry, Burlington House, London WlV OBN.

W. W. Eckenfelder, J. Patoczka & A. T. Watkins (1985). "Wastewater Treatment." *Chemical Engineering*. Sept. 2, 1985, pp. 60-74.

J. H. R. Kagi and Y. Kojima (1987). "Chemistry and Biochemistry of Metallothionein. Metallothionein II." (Kagi, J. H. R. and &. Kojima, eds.), *Proceedings of the Second International Meeting on Metallothionein and Other Low Molecular Weight Metal-binding Proteins*, Birkhauser Verlag, Basel, p. 25-61.

J. H. R. Kagi and B. L. Vallee (1961). "Metallothionein: a Cadmium and Zinc-containing Protein from Equine Renal Cortex." *Journal Biological Chemistry*, Vol. 236(9), pp. 2435-2442.

M. H. Frey, et al. (1985). "Polypeptide-metal Cluster Connectivities in Metallothionein 2 by Novel $^1H$-$^{113}Cd$ Heteronuclear Two-Dimensional NMR Experiments." *Journal American Chemical Society*, Vol. 107, p. 6847-6851.

A. C. Murasugi, et al. (1981). "Cadmium-Binding Peptide Induced in Fission Yeast, Schizocaccharmomyces pombe." *Journal of Biochemistry*, Vol. 90, pp. 1561-1564.

N. J. Robinson and P. J. Jackson (1986). "Metallothionein-like" metal complexes in angiosperms; their structure and function." *Physiology of Plant*, Vol. 67, p. 499-506.

E. Grill, et al. (1987). Phytochelatins, a class of heavy-metal-binding peptides from plants, are functionally analogous to metallothioneins." *Proceedings of National Academy of Science U.S.A.*, Vol. 84, pp. 439-443.

D. G. Hoare and D. E. Koshland (1966). "A Procedure for the Selective Modification of Carboxyl Groups in Proteins." *Journal American Chemical Society*, Vol. 88(9), pp. 2057-2058.

These references are incorporated herein by reference.

It is therefore desirable to obtain a solid material which is selective for cadmium ion in the presence of interfering ions. This present invention presents the design, synthesis and characterization of such an adsorbent.

SUMMARY OF THE INVENTION

The present invention relates to an adsorbent synthetic polymer having improved selectivity for cadmium ion, comprising a water-insoluble synthetic polymeric material (I) having covalently attached surface pendant chelating groups having a multiplicity of terminal thiol (—SH) groups, wherein pairs of thiol groups are connected by a group, —R—, having between about 10 and 16 atoms of the structure:

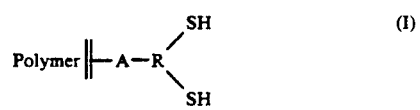

which thiol terminated chains are capable of chelating cadmium ion in rings of between about 11 and 17 atoms, and A is selected from alkylene having 1 to 10 carbon atoms, cycloalkylene, aryl, or arylalkylene.

In another aspect, the present invention relates to an adsorbent polymer for cadmium wherein the pendent chelating group, —R—, contain 13 linking atoms selected from carbon, nitrogen and sulfur which terminates in a pair of thiol (—SH) groups.

In another aspect, the present invention relates to an adsorbent polymer wherein the water-insoluble synthetic polymeric solid material is an organic ion-exchange polymer.

In another aspect, the present invention relates to an adsorbent polymer (II) having improved selectivity for cadmium, wherein the pendent chelating groups have a thiol structure:

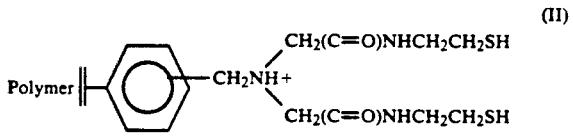
(II)

In another aspect, the present invention relates to a process for the removal of cadmium ion from an aqueous solution containing cadmium ion, which process comprises:

(a) contacting an aqueous solution containing cadmium ion with an effective amount of water-insoluble solid material (I) having covalently attached surface pendant chelating groups having a multiplicity of terminal thiol (—SH) groups, wherein pairs of thiol groups are connected by a chain —R— having between about 10 and 16 atoms of the structure:

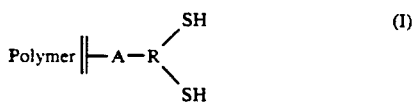
(I)

which thiol terminated chains are capable of chelating cadmium ion in rings of between about 11 and 17 atoms, for a time effective for the pairs of thiol groups to bind the cadmium ion; and (b) separating the solid material and the aqueous solution having a reduced content of cadmium ion.

In yet another aspect, the present invention relates to the above process, wherein the solid material is a polymer (II) having organic pendant chelating thiol (—SH) groups of the structure;

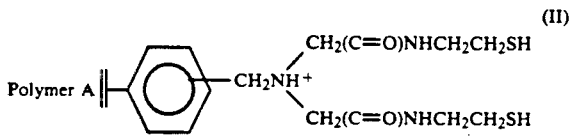
(II)

In a preferred embodiment, the chelated cadmium is:

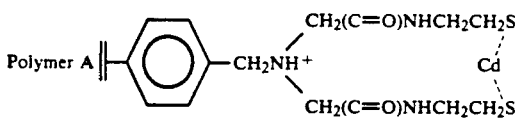

BRIEF DESCRIPTION OF THE FIGURES

FIG. 2 shows a synthesis of the cadmium chelating solid material. CHELEX, as a water-insoluble ion exchange resin, is contacted with a cystamine and a water-soluble carbodiimide to produce the dithiothreitol (DTT) which is reduced to the Thiolex.

FIGS. 5A and 5B show the time course for the adsorption of cadmium by Thiolex at various initial ratios of (zinc)/(cadmium). Time course for the adsorption of cadmium by Chelex at various initial rations of (zinc)/(cadmium). Experimental conditions are: 50 mM PIPES (Piperazine-N,N'-bis-2-ethane Sulfonic acid), 150 MmM NaCl, pH 6.1, 25° C.

FIG. 6 shows the course for the release of cadmium from Thiolex in the presence of competing ligands at various pH's. The experimental conditions are: 20 mM ligand, 150 mM NaCl, 25° C.

FIGS. 8A and 8B are schematic diagrams of three potential rate-limiting adsorption mechanisms: 1. Mass transfer through the fluid film surrounding the particle, 2. Diffusion along a pore in the particle, 3. Intrinsic rate of ion chelation at a site in the particle.

FIG. 8B is a magnification of the pendant chelating groups on the surface of a pore of a water-insoluble resin of FIG. 8A.

FIG. 8C is a schematic diagram for the non-reacting shrinking-core model used in the determination of rate-limiting adsorption mechanism.

FIG. 9 is a graph of the effect of pH on the rate-limiting for cadmium adsorption by Thiolex. Experimental points are presented at various pH's while theoretical curves based on non-reacting shrinking-core model are presented for each rate-limiting mechanism. The experimental conditions are the same as in FIG. 7.

FIG. 10 shows the intramolecular hydrogen bonding in Thiolex. Hydrogen-bonded structures such as those shown here probably hinder cadmium adsorption at neutral pH.

FIG. 11 is a graph showing the effect of ammonium chloride on the observed rate of cadmium adsorption by Thiolex at constant pH. Experimental conditions 50 mM HEPES, 1.4 M ionic strength, pH 8.0, 25° C.

DETAILED DESCRIPTION OF THE INVENTION AND PREFERRED EMBODIMENTS

Definitions

As used herein:
"Alkylene" refers to —$(CH_2)_n$—wherein n is 1 to 10 carbon atoms.
"Aryl" refers to benzene, toluene, naphthalene and the like. In this invention the aryl group is connected to the polymer backbone and to chain —R—.
"Arylalkylene" refers to groups such as

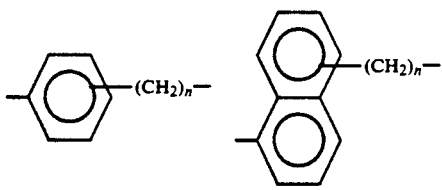

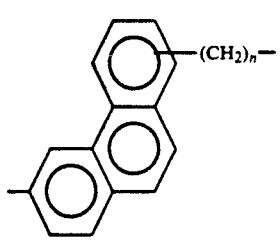

where n is 1 to 10, where the alkylene is connected to chain R. A preferred group is

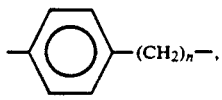

especially where n is 1.

"Cadmium" or "(Cd)" refers to the cadmium ion, $Cd^{+2}$.

"Chelex" refers to commercially available synthetic ion exchange resin available from Bio-Rad, Inc., Richmond, Calif. It is a copolymer of styrene-divinyl benzene which produces a water-insoluble crosslinked organic polymeric resin.

"Cycloalkylene" refers to an aliphatic group having a ring structure, such as

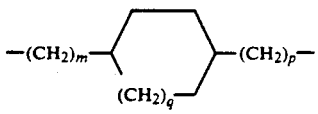

wherein m is 0 to 4, p is 0 to 4, and q is 0 to 2.

"Pendant chelating group" refers to the —A—R—(SH)—SH group as is defined herein.

"Pre-Thiolex" refers to a water-insoluble polymeric resin having the structure (DDT) shown in FIG. 2.

"Polymer" refers to the backbone of the water-insoluble polymer. This Polymer can be any combination of carbon, hydrogen, nitrogen, oxygen atoms or mixtures of these atoms, to which can be attached pendant groups (or the polymer already has pendant groups). Homopolymers, copolymers, block polymers, segmented polymers or the like are useful so long as the resulting polymer is water-insoluble. Preferred polymers are 'Chelex' or any aromatic polymer (e.g. aromatic polycarbonate) in which the aromatic group can be chloromethylated (to add —CH2Cl) according to convention reaction methods, and followed by conventional amination to produce a group

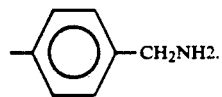

In a preferred embodiment, Group A is

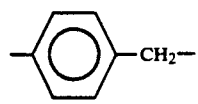

and the 'NH2' after subsequent reaction becomes part of the 'R' chain.

"Thiolex" refers to the selective synthetic ion exchange resin having pendant chelating groups of the present invention.

A brief overview of the chemistry underlying cadmium-binding observed in biological systems is of interest.

Metallothionein was the first cadmium-binding protein to be isolated. The protein as its name implies, is rich in metals and thiol groups. Typically, seven metal atoms are present per molecule and the thiol-containing cysteine constitutes 30 percent of the total amino acid composition. The protein's dissociation constant ($K_D$) for cadmium has been measured potentiometrically to be $10^{-22}$ M, indicating a very strong affinity for the metal. Moreover, spectrophotometric titrations of the protein have revealed a 3000-fold higher selectivity for the binding of cadmium relative to zinc.

Figure 1A:
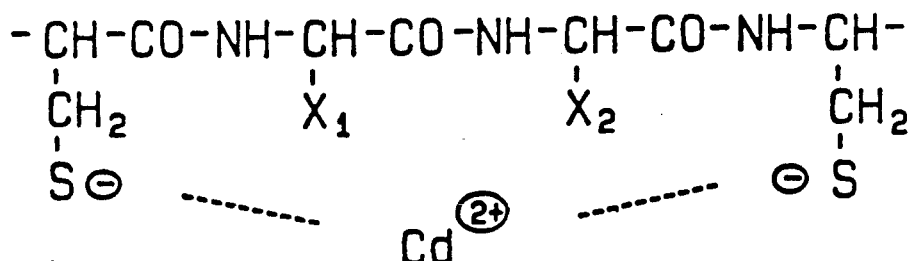
FIGS. 1A, 1B, 1C and 1D are schematic representations of natural and synthetic cadmium-bonding molecules.
Figure 1B:
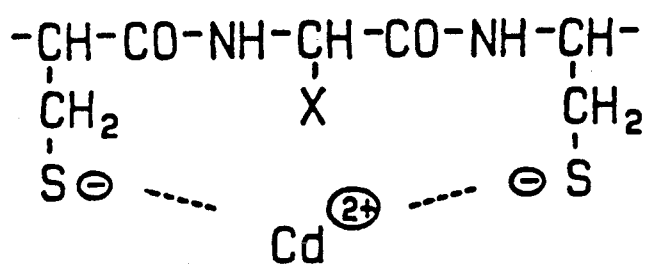
Figure 1C:
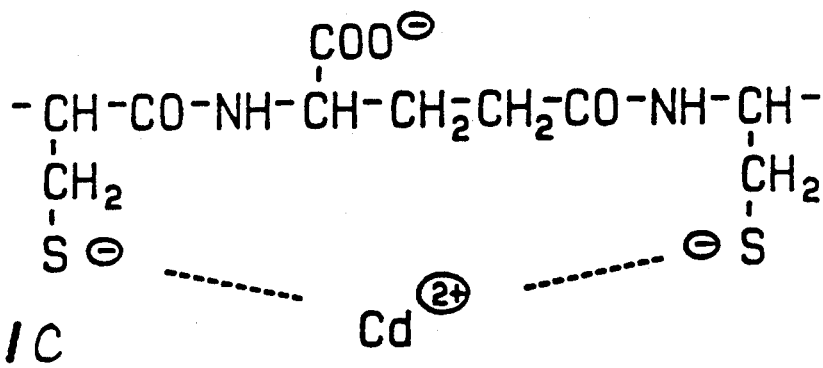

An examination of the relation between the protein's primary structure and the thiolate-metal connectivities shows that amino acid sequential motifs C—X—C and C—X—X—C (where "C" is cysteine and "X" is a non-cysteine amino acid) recur frequently over the length of the polypeptide. Moreover, the vicinal cysteines of these moieties usually form a closed ring by being associated with the same cadmium ion. Consequently, the cadmium clusters may be visualized as strings of 10 to 16- (preferably 12 to 15-) membered chelate rings formed by the joining of nearby thiolates to the same cadmium atom. FIGS. 1A and 1B illustrate schematically the rings formed by C—X—C and C—X—X—C with cadmium. Similar rings are probably also formed by cadmium- binding peptides ("Cadystins" or "Phytochelatins"), which have been isolated from yeast and plant cell cultures. A remarkable similarity is evidence between the peptide cadmium-binding unit (FIG. 1C and the metallothionein cadmium-binding unit (FIGS. 1A and 1B).

In accordance with the present invention, a general process for the preparation of an insoluble composition as defined above can be characterized in that organic coordinating sites capable of chelating metal are covalently fixed to the surface of a suitable carrier. Any suitable means of covalently fixing organic coordinating sites to a carrier (or polymer) can be used provided that the composition obtained has the necessary chelating activity.

Turning now to carriers (or polymers) suitable in accordance with the present invention, they must of course be insoluble in the liquid medium of intended use; for example, the carrier can be water insoluble. Desirably, the carrier is also inert in the liquid medium of intended use. The carriers can be in particulate or solid form.

The carrier (or polymer) can be an organic or inorganic compound. For example, the carrier may be a natural or modified natural polymer (e.g. lignin, agar, alignate, glucan, cellulose, dextran, cellulose acetate, humic acid, etc.) a synthetic organic polymer (e.g. a polyamide, a polyamine, a polyacrylamide, a polyester, a polyurethane, a polyethylene, a polystyrene, a polypropylene, a polycarbonate, a silicone, nylon, latex, a polyfluoolefin, etc.) or an inorganic material (a ceramic, a glass, carbon, etc.).

The Polymers useful in this invention are defined hereinabove. A preferred embodiment is the polymer wherein in R, carbon, nitrogen and sulfur atoms are selected from —CH$_2$—, —CH=, —C=O, —NH, —N=, and —S— groups.

In a preferred embodiment, A is aromatic, preferably

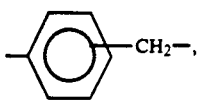

especially

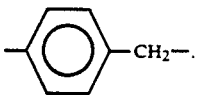

In a preferred embodiment R has 9 to 15 atoms (plus the two thiol end groups). It is not necessary that R has a 'symmetrical' structure. The carbon, nitrogen and sulfur atoms in R may be random and the attachment of group R to group A may be at any point along group R, so long as R has 10 to 16 atoms which terminate in the reactive thiol (—SH) groups. Preferred 'R' groups include:

HS—(14 atoms of carbon nitrogen or sulfur)—SH,
HS—(11 atoms of carbon or nitrogen)—SH, or
HS—(11 atoms selected from —N—, —CH$_2$—or C=O)—SH.

Figure 1D:
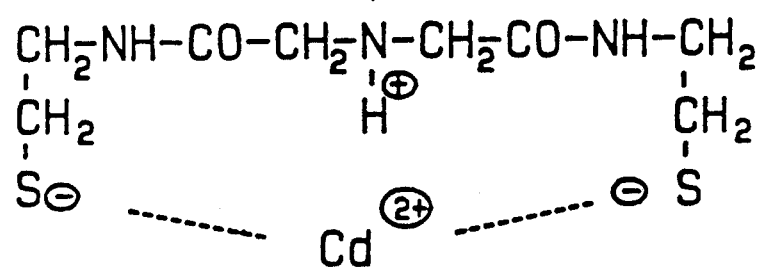

Chelex, is a commercially available synthetic material (resin) containing pendant iminodiacetate groups which are adapted to mimic the natural metal-binding groups. A schematic representation of the adsorbent synthesized in the present work is presented in FIG. 1D. Both the peptide (FIG. 1C) and the synthetic adsorbent (FIG. 1D) form 14-membered rings upon binding cadmium with the vicinal thiolate groups, and both contain two peptide bonds in their structure.

Cadmium Adsorption by Thiolex—Thiolex Capacity

Figure 3:
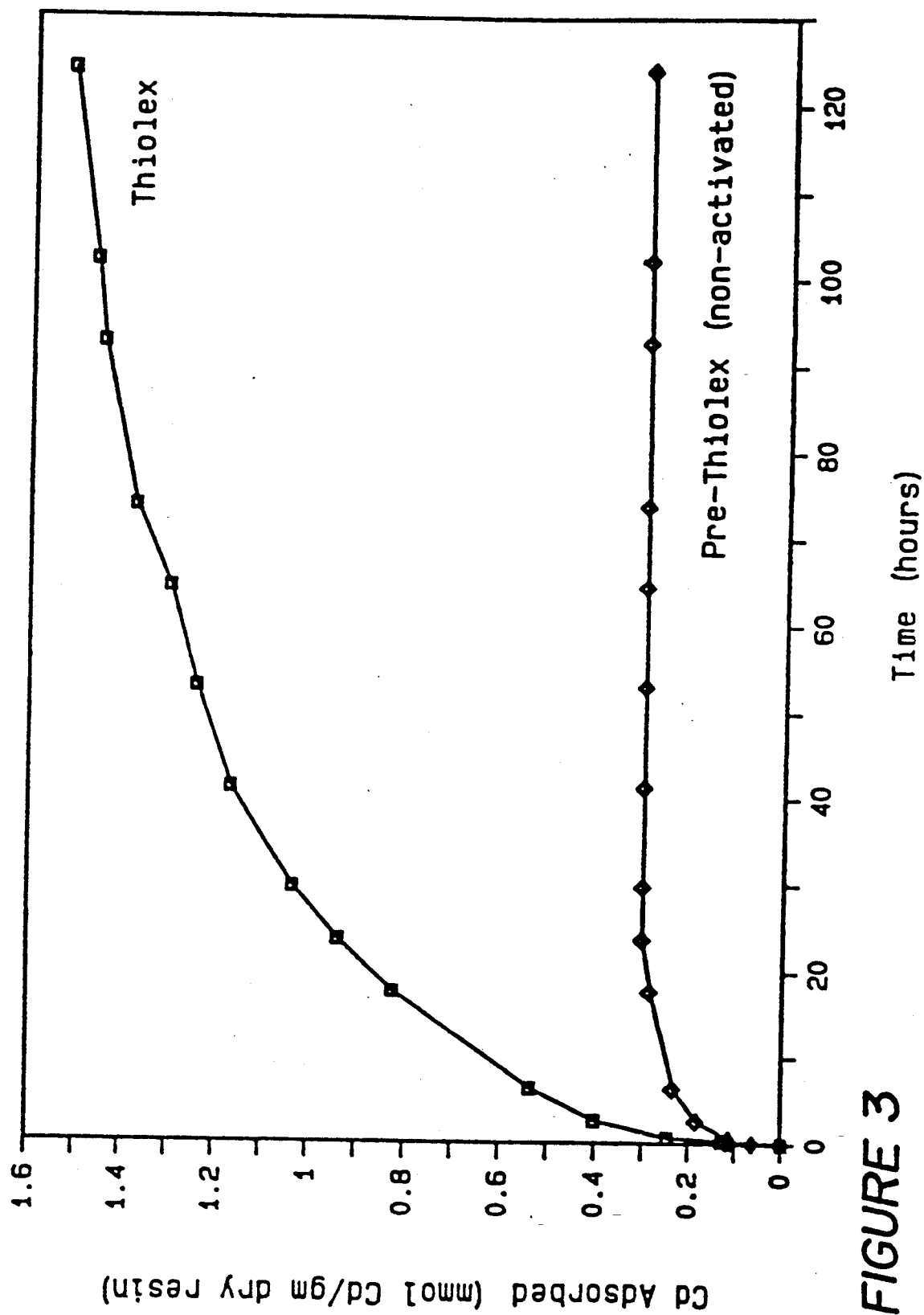
FIG. 3 shows the time course for the adsorption of cadmium by Thiolex (activated) and "Pre-Thiolex" (non-activated) under the experimental conditions of: 50 mM HEPES (N-2-Hydroxyethyl piperazine-N'-2-ethane Sulfonic Acid), 150 mM NaCL, pH 7.0, 25° C.

The time plot for cadmium adsorption by "Pre-Thiolex" (non-activated) and Thiolex (activated) at pH 7.0 are shown in FIG. 3.

Thiolex approaches a maximum capacity of 1.5 mmol Cd/gm dry resin while "Pre-Thiolex" exhibits a capacity of 0.3 mmol cadmium/gm dry resin. The cadmium binding by Pre-Thiolex has been found to be a weak association by desorption and Raman spectroscopic studies.

The observed Thiolex capacity of 1.5 mmol cadmium/gm dry resin (or 0.4 mmol cadmium/ml wet resin) significantly exceeds the highest capacity one would obtain with an analogous affinity resin. The estimated capacity for metallothionein immobilized on CNBr-Sepharose (Pharmacia) would be 0.01 mmol cadmium/ml resin assuming a typical loading of 10 mg protein/ml resin.

Figure 4:
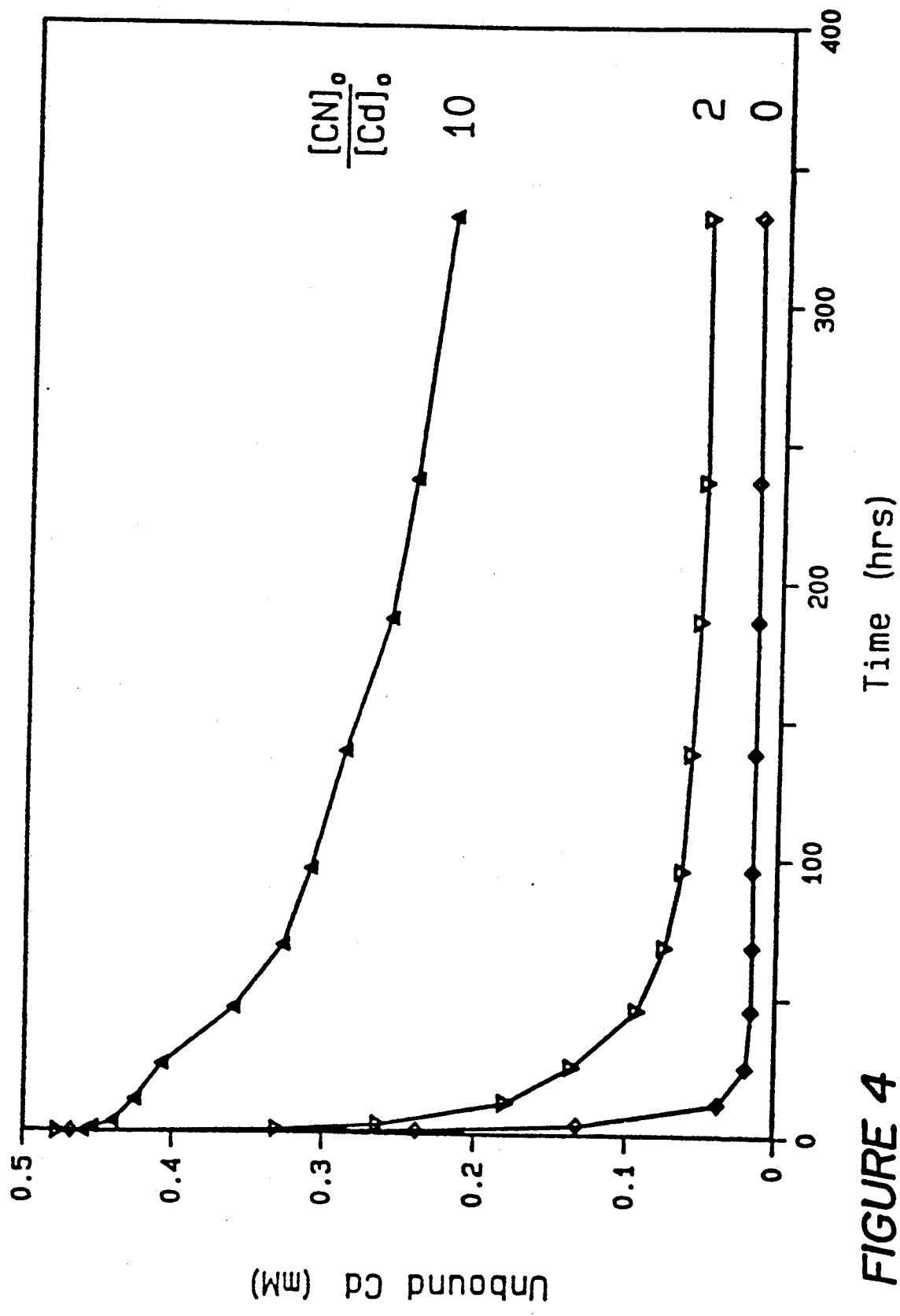
FIG. 4 shows the time course for the adsorption of cadmium by Thiolex at various initial ratios of (cyanide)/(cadmium). Experimental conditions are: 50 mM CHES (Cyclohexylaminoethane Sulfonic Acid), 100 mM NaCl, pH 10.0, 25° C.

Affinity for Cadmium—The time plot of cadmium adsorption by three Thiolex samples in the presence of cyanide ion are shown in FIG. 4. As $[CN]_o/[Cd]_o$, the initial concentration ratio, is increased from 0 to 10, less cadmium is adsorbed by the resin due to the competition for cadmium by free cyanide ion (CN$^-$). By taking the final data points as equilibrium values and accounting for competitive complexation by CN$^-$, a Thiolex dissociation constant is calculated: $K_{D, Thiolex} = 2 \times 10^{-10}$ M. Additional $pK_A$'s and $pK_D$'s for CN$^-$ required in the calculation are known. The calculated $K_D$, Thiolex has been verified by a similar competition study where ammonia was used instead of CN$^-$.

Selectivity—The time courses for Cd adsorption by three Thiolex samples in the presence of zinc are shown in FIG. 5A. As $[Zn]_o/[Cd]_o$, the initial concentration ratio, is increased from 0 to 100, less cadmium is adsorbed due to competition with zinc for resin adsorption sites. By taking the final data points as equilibrium values the relative affinity (or selectivity) of Thiolex for cadmium over zinc may be calculated. Thiolex is between about 25 to 30-fold more selective for cadmium than zinc.

For comparison, the same study was performed with Chelex instead of Thiolex. Chelex is a commercially available chelating ion exchange resin (Bio-Rad) which binds a variety divalent cations and also serves as a starting material for the synthesis of Thiolex. The results, presented in FIG. 5B, show that little cadmium is adsorbed by Chelex in the presence of zinc. From the data presented, it has been determined that Chelex is about six-fold more selective for zinc than cadmium.

Desorption—The time plots for cadmium release by four Thiolex samples in the presence of aqueous oxalate (pH 7), EDTA (pH 10), cysteine (pH 10) or pyro-phosphate (pH 2) are shown in FIG. 6. The pyro-phosphate at pH 2 was most effective, releasing 69 percent of the bound cadmium, while oxalate at pH 7 was least effective, releasing an undetectable amount of cadmium. The cysteine and EDTA was intermediate, yielding about a 30 percent release. Multiple treatment with these basic solutions is expected to remove virtually all of the cadmium ion.

Adsorption Kinetics and Mass Transfer

Figure 7:
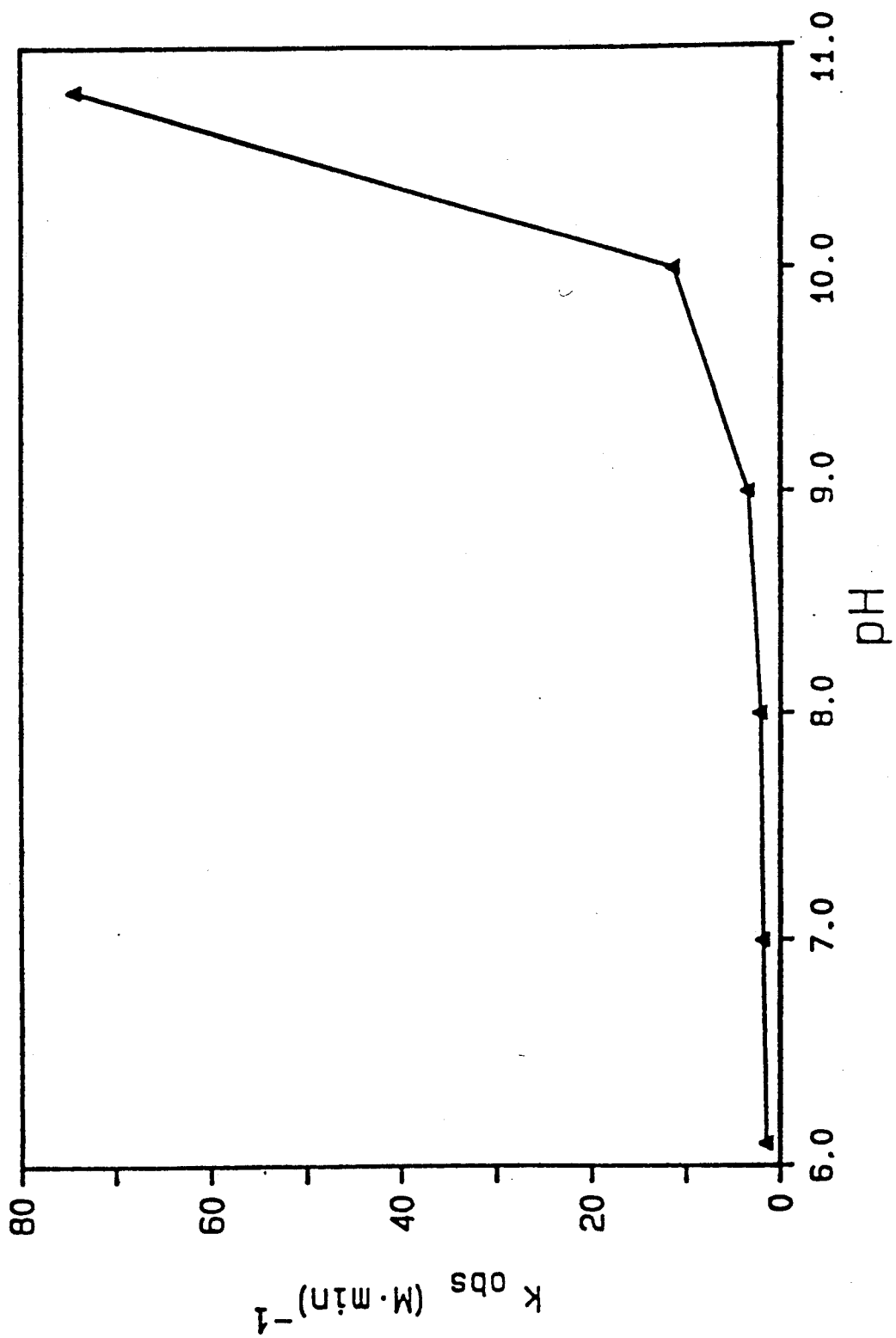
FIG. 7 is a graph to show the effect of pH on the observed rate of cadmium adsorption by Thiolex. The experimental conditions are: 50mM buffer, 150mM NaCl, 25° C.

Effect of pH on Adsorption Rates—Six Thiolex samples buffered over the pH range 6.1 to 10.8 are monitored over the course of their equilibrations with cadmium and then observed second order rate constants, $k_{obs}$, for the cadmium complexation with the Thiolex are calculated from the initial rate data at each pH. The dependence of this rate constant on pH is shown in FIG. 7. Below pH 9.0 there is little pH dependence, but from pH 9.0 and 10.8 the rate constant increases one to two orders of magnitude.

Effect of pH on the Rate-Limiting Adsorption Mechanism

The observed second order rate constant, $k_{obs}$, does not necessarily represent the intrinsic rate of complexation by the Thiolex resin. The resin particles FIG. 8A are porous spheres of about 200 μm diameter with binding sites distributed throughout the particle; a metal ion encounters several resistances as it moves from the bulk solution to a binding site. The ion must move through the stagnant fluid film at the surface of the particle, diffuse along a pore to the adsorption site, and finally be adsorbed, as shown in FIGS. 8B and 8C. Any of these resistances may govern the observed rate of cadmium depletion from bulk solution. A simple model, described below, has been utilized to determine the rate-limiting adsorption step at different pH's.

The actual rate-limiting adsorption process is determined by comparing experimental data with predicted curves for each of the three mechanisms described above. The predicted curves are generated by applying a simple non-reacting shrinking-core model to each mechanism. A schematic representation of the model is shown in FIG. 8C. The model assumes that the cadmium ions initially bind and saturate sites at or near the surface of the particle. As adsorption proceeds, the boundary between the saturated outer shell and the non-reacted inner core migrates toward the center of the particle, until-at long times—it has saturated all the available sites in the resin.

The new synthetic cadmium adsorbent, "Thiolex," of the present invention has the desired properties to compete successfully with traditional cadmium removal processes. It has demonstrated a high affinity ($K_D = 2 \times 10^{-10}$ M) needed to reduce cadmium to parts-per-billion levels and a favorable selectivity (25-fold higher for cadmium over zinc) to avoid being saturated by other metals present in waste streams. Moreover, its capacity of (1.4 mmol cadmium/gm dry resin) is comparable to the commercially available metal chelating resin, Chelex (Bio-Rad)—from which it is synthesized. While Chelex is able to bind cadmium with a comparable affinity, its selectivity for cadmium over zinc is more than two orders for magnitude (100 times) lower than Thiolex's. The more traditional non-chelating ion exchange resins demonstrate lower affinities and selectivities for cadmium than both Thiolex and Chelex.

Traditional precipitation processes for cadmium removal (e.g., as the hydroxides) generally require pre-processing if cadmium complexing ligands, such as ammonia or cyanide are present. Thiolex, by virtue of its very high affinity, is able to strip Cd away from ligands such as ammonia or cyanide. Ammonia even appears to enhance the rate of cadmium adsorption by Thiolex due to its ability to perturb intramolecular hydrogen bonding at the Thiolex sites.

The following Examples are provided to further explain and describe the present invention. They are not to be construed to be limiting in any way.

The starting materials used are for the most part commercially available from chemical supply houses as published annually by Chemical Sources, U.S.A., Columbia, S.C. Aldrich Chemical Company, Milwaukee, Wis., and others cited specifically herein are the usual sources.

EXAMPLE 1

Synthesis of Thiolex

The synthesis product is a thiolated chelating ion exchange resin. For brevity, the new resin is referred to as "Thiolex".

A. 20 gms of Chelex-100 (an ion exchange resin having pendant iminodiacetate groups available from Bio-Rad, Richmond, Calif.) directly from the bottle, without modification, is placed in a 400 ml beaker with 320 ml 0.5 M HCl and stirred 30 minutes using a magnetic stirring bar. The resin is then washed twice with 320 ml of distilled water. Finally, 260 ml of distilled water is added to the resin.

B. 20 gms of Imidazole (Sigma, St. Louis, Mo.) is added to the resin and the pH adjusted to 5.0 with concentrated hydrochloric acid (about 10 ml). 50 gms of 1-Ethyl-3-(3-dimethylaminopropyl)carbodiimide hydrochloride (Sigma - equivalent to a ten-fold molar excess) is added to the stirring mixture. The pH is controlled at pH 5.0 for the next 30 minutes. 38. Gms cystamine dihydrochloride (Fluka, Hauppauge, N.Y.) is added to the stirring mixture, and 4 ml 1N NaOH is added over the course of one hr. to maintain the pH in the 4.5 to 5.0 range. The resin is placed in the dark and stirred for 12 hours.

C. After 12 hours the pH of the suspension drops to less than 0.5 units. Two ml of 1N NaOH are added to restore the pH to 5.0. The mixture is returned to the dark, and stirred for 15 hours to complete the reaction.

D. The functionalized resin is rinsed twice with 300 ml of distilled water and placed in a liquid chromatography column. A peristaltic pump is connected to the column outlet and the resin is washed with de-gassed distilled water at a flowrate of 0.8 ml/min for 20 hours. The water is de-gassed by aspirating it in a filter flask while subjecting the flask to ultrasound for 3–5 minutes (Bransonic 12 ultrasonic cleaning vessel, Shelton, Conn.). The column of resin is washed with 37 ml of high pH buffer (0.1 M Tris-HCl, 0.5 M NaCl, pH 8.0) for eight hours. It is then washed with 100 ml of distilled water for 15 minutes, 250 ml of low pH buffer (0.1 M Acetate, 0.5 M NaCl, pH 4.0) for three hours, and 820 ml distilled water over 14 hours.

E. The resin is removed from the column, aspirated over fritted glass funnel to remove interstitial water, and lyophilized (Freeze Dry-5 unit, Labconco, Kansas City, Mo.) for 27 hours to remove all water. The 5.6 gms of dry resin product is placed in a glass vial and stored in the dark at 25° C. until used.

F. An empty 22 ml glass vial, cap and magnetic stir bar are weighed prior to the addition of resin. A thin disk of polystyrene is inserted in the vial cap to prevent exposure of the solutions to the aluminum foil that lines the cap. For the typical batch experiment 0.010 gm of resin is placed in the glass vial with a magnetic stirring bar. 20 Ml de-gassed DTT solution is added, and the mixture is firmly capped and stirred 12 hours at 25° C. The DTT solution contains 50 mM of DL-Dithiothreitol (Sigma), 50 mM HEPES (N-2-Hydroxyethyl) piperazine-N'-2-ethanesulfonic acid, Sigma, 150 mM NaCl, pH 8.0.

G. Following activation, the Thiolex resin is very thoroughly washed to remove all DTT. To wash, the resin is permitted to settle and 18–20 ml supernatant solution is removed using a 20 ml pipet. Extreme care is employed to avoid disturbing the resin. Typically, the resin is washed five to eight times over 12 hours in order to allow DTT in the pores of the resin to diffuse out. The wash buffer usually contains degassed 50 mM HEPES, 150 mM NaCl at pH 7.0. When experiments require other buffer conditions, the appropriate buffers are incorporated into the resin washes. At this point the Thiolex is activated and prepared to bind metal.

EXAMPLE 2

Thiolex-Blank

A vial containing appropriately buffered Thiolex is mixed with a magnetic stirrer in a 25° C. water bath at least ten minutes. Then a cadmium spike solution is introduced and small volumes of solution are periodically removed for analysis.

A. The cadmium spike solution contains cadmium chloride ($CdCl_2.2.5H_2O$, Analytical Reagent, Mallinckrodt, Paris, Ky.) and radioisotope $^{109}Cd$ (Carrier-free, NEN Research Products, Boston, Mass.). The Thiolex is typically equilibrated in 20 ml of a 1 mM cadmium solution. Thus, the roughly 200 μl spike will contain 104 μl 0.14 M $CdCl_2$ and 60μl $^{109}$cadmium (roughly 1.2 μCuries).

B. A control vial containing cadmium but no resin is prepared for every cadmium spike. This vial is stirred and analyzed along with the experimental vials to provide a reliable concentration reference point and ensure that no cadmium precipitates are adsorbed by the vial.

C. Solution samples are removed over the course of the experiment to determine the free cadmium concentration. Since the Thiolex particles are continually agitated while the vial is in the water bath, the particles must be allowed to settle before a pipet tip is introduced into the solution for sampling. To reduce sampling times, the vial is removed from the bath and immediately tilted 20° from the vertical axis to enhance settling rates by the "Boycott Effect". The pipet tip is inserted near the air/water interface and 150 μl are removed--taking care not to remove any freely suspended particles.

D. The sample is placed in a 6ml plastic liquid scintillation vial (NEN Research Products, Boston, Mass.) with 5 ml scintillation cocktail (Aqueous Counting Cocktail, Formulat-963, NEN Research Products), capped and shaken. Samples are counted several times with a LS-230 Liquid Scintillation System (Beckman, Irvine, Calif.) to ensure reproducibility.

EXAMPLE 3

Cadmium Adsorption by Thiolex

A. Capacity—15 mg "Pre-Thiolex" (synthesis through to DTT) and Thiolex are each separately equilibrated with cadmium in 50 mM HEPES, 150 Mm NaCl, pH 7.0. Each solution is sampled periodically and counted.

B. Affinity—Three samples cf Thiolex resin (10 mg each) are equilibrated in 50 mM CHES (Cyclohexylaminoethane Sulfonic Acid; US Biochemical Corp., Cleveland, Ohio), 100 mM NaCl, pH 10 at 25° C. Cyanide (CN) (Potassium Cyanide; Matheson, Norwood, Ohio) and cadmium are mixed prior to spiking the Thiolex. Initial cadmium concentrations for all samples ranged from 0.45 to 0.48 mM, and the CN/Cd ratio was set at 0, 2 and 10. Upon addition of the three different CN/Cd spikes, 150μl volumes are sampled periodically and counted.

C. Selectivity—Three Thiolex samples and three Chelate samples (10 mg each) are washed in PIPES buffer (50 mM PIPES (Piperazine-H,N'-bis[2-ethane Sulfonic acid], Sigma), 150 mM NaCl, pH 6.1) prior to spiking with zinc/Cd mixtures. Following addition of the spikes, solutions are sampled periodically and counted.

D. Desorption—Four samples of cadmium-saturated Thiolex (15 mg each) are prepared by standard procedures. The cadmium solutions are then replaced with competitive ligand (preferably about 20 mM) and 150 mM NaCl (preferably about 150 mM) at a pre-set pH. The ligands and pH's tested are: pyro-phosphate ($Na_2P_2O_7.10H_2O$, Fluka) a pH2, EDTA ($Na_4EDTA$, Fisher) at pH 10, cysteine (Sigma) at pH 10 and oxalate (Mallinokrodt) at pH 7. Solutions are sampled periodically and counted for released cadmium.

EXAMPLE 4

Adsorption Kinetics and Mass Transfer

A. Effect of pH—Six Thiolex samples (18) mg are prepared as described in Example 1, but the final washes following DTT activation contained 150 mM NaCl and 50 mM buffer at the desired pH. Buffers are titrated using ammonium hydroxide. The ammonia prevents precipitation of the cadmium at elevated pH by discouraging the formation of cadmium hydroxide. The buffers used are summarized below in Table 1.

TABLE 1

| pH | Buffers for pH Study |
|---|---|
| | Buffer |
| 6.1 | PIPES (Piperazine-N,N'-bis[2-ethane Sulfonic acid, $pK_A$ = 6.8, Sigma) |
| 7.0 | HEPES (N-2-Hydroxyethyl piperazine-N'-2-ethane Sulfonic Acid, $pK_A$ = 7.5, Sigma) |
| 8.0 | HEPES |
| 9.0 | CHES (Cyclohexylaminoethane Sulfonic Acid, $pK_A$ = 9.55, US Biochemical Corp.) |
| 10.0 | CHES |
| 10.8 | CAPS (Cyclohexylaminopropane Sulfonic Acid, $pK_A$ = 10.4, US Biochemical Corp.) |

Samples are spiked with cadmium and 150μl volumes are sampled periodically and counted.

B. Effect of Ammonia—The dependence of the adsorption rate on ammonia is determined at pH 8.0. Four samples of Thiolex (15 mg) are equilibrated with pH 8.0 HEPES buffer containing up to 1.4 M $NH_4OH$. Samples containing less than 1.4 M $NH_4OH$ are supplemented with NaCl to maintain a constant ionic strength. 150μl Volumes are sampled periodically and counted.

While only a few embodiments of the invention have been shown and described herein, it will become apparent to those skilled in the art that various modifications and changes can be made in the selection of synthetic polymer and in the selection of the pendant chelating group to produce the chelating material to selectively remove cadmium from aqueous solutions particularly in the presence of zinc ion and/or ammonia or cyanide and the process thereof without departing from the spirit and scope of the present invention. All such modifications and changes are intended to be carried out thereby.

We claim:

1. An adsorbent polymer having improved selectivity for cadmium ion in the presence of zinc ion wherein the polymeric material has a structure (II) with multiple pendent chelating groups having a thiol structure:

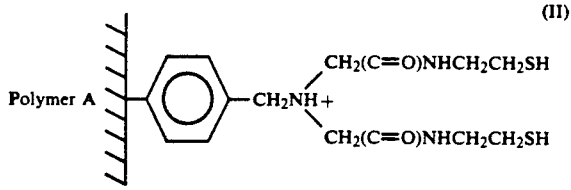

wherein Polymer A designates a backbone of a water-insoluble synthetic organic polymer selected from the group consisting of a styrene-divinylbenzene copolymer, a polyamide, a polyamine, a polyacrylamide, a polyester, a polyurethane, a polyethylene, a polystyrene, a polypropylene, and a polycarbonate.

2. The adsorbent polymer of claim 1 wherein the polymer is a water-insoluble styrene-divinylbenzene copolymer.

3. The adsorbent polymer of claim 1 wherein the water-insoluble synthetic polymer is selected from a polyamide, a polyamine, a polyacrylamide, a polyester, a polyurethane, a polyethylene, a polystyrene, a polypropylene, or a polycarbonate.

* * * * *